UNITED STATES PATENT OFFICE.

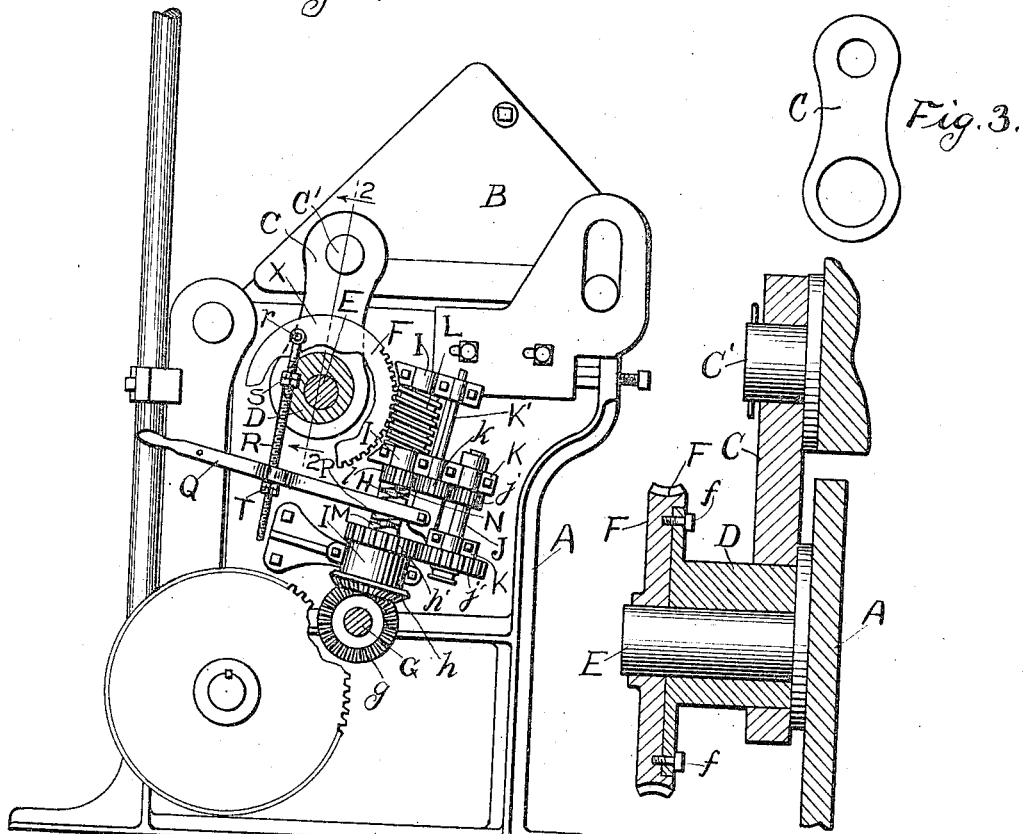
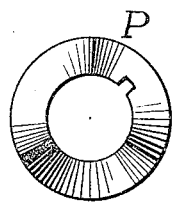
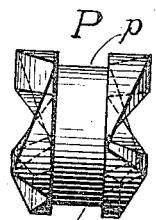
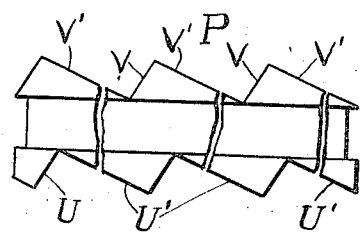

NIC KRUMP, OF CHICAGO, ILLINOIS.

CLUTCH MECHANISM.

1,240,225.

Specification of Letters Patent. Patented Sept. 18, 1917.

Application filed April 3, 1916. Serial No. 88,656.

*To all whom it may concern:*

Be it known that I, NIC KRUMP, a citizen of the United States, and a resident of Chicago, in the county of Cook and State of Illinois, have invented certain new and useful Improvements in Clutch Mechanism, of which the following is a specification.

To those skilled in the art, it is well known that where clutch mechanism is used to lock a rotating body to a body at rest, if the speed of the rotating body be great or the load imposed by the sudden movement of the non-rotating body be heavy, it is necessary that the teeth of the locking bodies, be well engaged, to avoid breaking thereof, at the time the locking together is effected.

The principal objects of this invention, are to obtain a clutch in which the locking of the rotating member of the clutch to a non-rotating member may be effected without liability to break or injure the meeting faces of said members when said rotating member is traveling at high speed and a clutch wherein, when the rotating member thereof is traveling in a predetermined direction, the locking together of said rotating member and a predetermined non-rotating member will transmit rotation to said non-rotating member and when said rotating member is traveling in the opposite direction said members can not be so joined as to effect corresponding rotation in said non-rotating member.

Further objects of the invention are to obtain a clutch which will impart a rocking motion to a shaft and will not permit other than said rocking motion to be imparted thereto.

I have illustrated the invention by a drawing accompanying and forming a part of this specification, in which—

Figure 1, is an end elevation of a metal folding machine with mechanism embodying this invention applied thereto.

Fig. 2, is a vertical section on line 2—2 of Fig. 1, viewed in the direction indicated by the arrows.

Fig. 3, is a front elevation of a link forming one of the elements of the mechanism illustrated in Figs. 1 and 2.

Fig. 4, is a front elevation of one of the members of the clutch mechanism embodying this invention.

Fig. 5, is a side elevation of the member illustrated in Fig. 4, and

Fig. 6, is a diagrammatic view of the periphery (unrolled) of the clutch member which is illustrated in Figs. 4 and 5.

A reference character applied to designate a given part indicates said part throughout the several figures of the drawings wherever the same occurs.

A, is a frame of a folding machine. B is a movable jaw thereon. C, is a link pivotally attached at one end thereof, by means of pivot $C^1$, to jaw B and at the other end thereof to eccentric D. E is a non-rotatable spur shaft rigidly attached to the frame A. F is a worm gear wheel. Eccentric D and worm gear wheel F are rigidly secured together as by bolts $f$ and are rotatably mounted on the spur shaft E.

In the operation of the folding machine it is desirable to rock the eccentric D and wheel F through a pre-determined angle and back to their initial position, and to do away with all possibility of said rocking of said eccentric and wheel being extended beyond said predetermined angle at either end of its movement, and prevent breaking of said mechanism or of any of the parts of said folding machine, are the primary functions of the mechanism embodying this invention.

G is a shaft of the folder which at times is run in one direction and at other times in the other direction, in the operation of the folder. $g$ is a beveled gear wheel which is rigidly secured on shaft G. H is a shaft rotatably mounted in bearings I and $h$ is a beveled gear wheel loosely mounted on shaft H to intermesh with beveled gear wheel $g$. $h^1$, is a gear wheel which is loosely mounted on shaft H and is attached to gear wheel $h$ to turn therewith. J is a shaft rotatably mounted in bearings K. $j^1$, is a gear wheel rigidly mounted on shaft J to turn therewith and to intermesh with gear wheel $h^1$. $j$ is a gear wheel rigidly attached to shaft J to intermesh with gear $k$ on shaft $K^1$. $l$ is a gear wheel loosely mounted on shaft H to engage with gear $k$, L is a worm which is rigidly mounted on said shaft H to turn therewith. M is a clutch member which is rigidly attached to gear $h^1$ and N is a clutch member which is rigidly attached to gear wheel $l$.

From the foregoing description of the members G to N, both inclusive, it occurs that when the shaft G is turning in a given direction the clutch members M and N will turn in opposite directions on the shaft H.

To turn the gear wheel F of the folder in a predetermined direction it is necessary to turn the worm L in a corresponding direction and said worm L being rigidly secured to the shaft H, in order to at all times turn said worm in the desired direction I mount the member P, illustrated in Figs. 4, 5, and 6 on shaft H, keyed thereto to turn therewith but movable longitudinal thereon, and so construct the faces of the several cam members, as will be hereinafter described, that when the cam members M, N, are turning in the wrong direction to obtain the predetermined rotation (to right or left) of said worm, no rotation of any kind can be imparted thereto by engagement of said cam member P with the cam members M or N, Q is a handle controlling the position of the cam member P relative to its neutral position or its engagement with the cam members M or N.

To obtain automatic stopping of the movement of gear F and eccentric D at both ends of its rocking movement, I pivotally mount bolt R on wheel F at the end $r$ of said bolt, and mount the nuts S and T on said bolt. This bolt R is illustrated in Fig. 1 of the drawings as extending through the handle Q, and the worm wheel F and eccentric D are shown in position, in said Fig. 1, with the nut T engaging with the under side of said handle Q and holding said handle Q, up; so that the free end thereof can not be depressed to bring the cam member P into engagement with the cam member M. When the parts Q R T and P are in the position illustrated in Fig. 1, and shafts G, J, $K^1$, and gear wheel $l$ are turning in the right direction, if handle Q be raised so as to bring the clutch members P and N into engagement, the shaft H and worm L will be turned in the right direction to move gear wheel F and eccentric D in a contrary direction to the movement of the hands of a clock, that is, the upper part thereof to the left; and the said engagement of members P and N may continue until the nut S forces handle Q down and into the neutral position in which it is illustrated in said Fig. 1. The above described neutral position of the handle Q is in the position into which it is carried by nut T when the gear wheel F moving in the direction of the hands of the clock has arrived at the limit of said movement.

The engaging faces of the clutch members M, N and P correspond, so that when the faces of clutch member P illustrated in Figs. 4, 5 and 6 are described, the corresponding faces of members M, N, are thereby described. The faces U and V of clutch member P are at an angle of substantially 45 degrees to the sides or ends of groove $p$ on clutch member P, and the faces $U^1$ and $V^1$, of said member P are at angles of substantially 60 degrees to said ends. The faces of the clutch members M and N corresponding with the faces of member P, as last above described, it occurs that when the members M, N are turning in a direction so that the faces U, V are brought into contact with corresponding faces on members M, N, motion of said member P (corresponding with the motion of said members M, N) will be imparted to said member P and from thence to said shaft H and worm L; but motion of said members M, N in the contrary directions will simply cause sliding between faces $U^1$ and $V^1$, and the corresponding faces of members M, N and no movement will be imparted to said member P or shaft H.

The faces U, V, of member P being engageable with the faces of the members M, N, to transmit rotation of said members M, N, to said member P, and said engagement being sufficiently firm to prevent the slipping of adjacent faces while a predetermined load is being carried, nevertheless, the angle of the meeting faces of said members is sufficiently inclined from planes parallel to the shaft H, to obtain slipping of said faces of said cam members when cam member P is overloaded, and the last above referred to slipping forces the member P and handle Q into the neutral position illustrated in Fig. 1. This result occurs when nut S is not properly adjusted on bolt, R.

The clutch members M, N, often turn at a comparatively high rate of speed, as well as in the opposite direction to what I term their operative rotation, and to enable the clutch member P to be forced into locking position with either of said members M, N, I place but few of the engaging faces U, V, on member P and correspondingly few engaging faces on members M, N, thus giving the operator time to throw member P against the desired one of the members M, N.

By the foregoing arrangements it will be readily seen that with the handle Q in the neutral position as illustrated in Fig. 1, and the worm gear wheel F and eccentric D in the position in which they are illustrated in said figure, said worm wheel can not be turned further to the right (in the direction of the hands of a clock), when cam members M, N, are turning in the right direction, that is, are operatively rotating, because the handle Q can not be forced down to force member P into engagement with member M; and if the gear wheel $l$ and cam member N be turning in the opposite direction, that is, in a direction to move the worm wheel F in the direction of the hands of a clock, on the bringing of the cam members P and N into engagement the meeting faces of said cam members will slide, and no rotation of cam member P, shaft H, worm L and worm wheel E will occur. If said cam member N however is turning in the proper direction the faces V of member P will be engaged by corresponding faces on the member N, and said member P, shaft H and worm L will be moved in the right direction to move said worm gear wheel F in the direction contrary to the movement of the hands of a clock.

It will be observed that the faces U and V are in such relation to the planes of the ends of groove $p$ that faces U require the cam member M to turn in one direction in order to engage with and turn said member P and shaft H and the faces V require the cam member N to turn in the opposite direction to engage with faces V to turn said member P and shaft H in the opposite direction.

I claim:—

1. In a clutch mechanism, clutch members mounted to turn loosely on a shaft, means to simultaneously turn said members in opposite directions, an additional clutch member movable on said shaft and keyed thereto, to turn therewith, and positioned between said first named clutch members, means to force said keyed clutch member into contact with said loosely mounted clutch members, the faces of said loosely members which engage when said loosely mounted members are turning in a predetermined operative direction being at an angle of approximately forty five degrees to a plane which is at right angles to said shaft, and the faces which engage when said loosely mounted members are turning in a non-operative direction being at an angle of approximately thirty degrees to said plane.

2. In a clutch mechanism, a rotatably mounted shaft, clutch members loosely mounted on said shaft, means whereby when one of said clutch members is turned in one direction the other thereof is turned in the opposite direction, an additional clutch member mounted to turn with and slide on said shaft, means to force said additional clutch member from a neutral position into contact with said oppositely turning members, said clutch members provided with projecting teeth having operatively engaging faces positioned at an angle of approximately forty five degrees to a plane which is at right angles to said shaft, and non-operatively engaging faces positioned at an angle of approximately thirty degrees to said plane.

3. A rotatable shaft, means to turn said shaft in opposite directions comprising clutch wheels loosely mounted on said shaft, an additional clutch wheel on said shaft between said first named wheels, said additional wheel movable on said shaft and keyed thereto to turn therewith, means to control the position of said additional clutch wheel, the operative faces of the teeth on opposite sides of said keyed clutch wheel being in parallelism and the operative meeting faces of the teeth on all said clutch wheels being at an angle of approximately forty five degrees to a plane at right angles to said shaft, the faces on the other side of all of said teeth being at an angle of approximately thirty degrees to said plane, whereby the teeth on one side of said keyed clutch wheel are adapted to engage to be driven by the loosely mounted clutch wheel adjacent to said side in one direction, and the teeth on the opposite side of said keyed wheel are adapted to engage to be driven by the loosely mounted wheel adjacent to said opposite side in the opposite direction, to respectively carry predetermined loads.

NIC KRUMP.

In the presence of—
CHARLES TURNER BROWN,
W. H. DREIS.

Copies of this patent may be obtained for five cents each, by addressing the "Commissioner of Patents. Washington, D. C."